United States Patent
Li et al.

(10) Patent No.: US 11,734,829 B2
(45) Date of Patent: Aug. 22, 2023

(54) METHOD AND DEVICE FOR PROCESSING IMAGE, AND STORAGE MEDIUM

(71) Applicant: Beijing SenseTime Technology Development Co., Ltd., Beijing (CN)

(72) Inventors: Tong Li, Beijing (CN); Wentao Liu, Beijing (CN); Chen Qian, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 163 days.

(21) Appl. No.: 17/236,051

(22) Filed: Apr. 21, 2021

(65) Prior Publication Data

US 2021/0241020 A1 Aug. 5, 2021

Related U.S. Application Data

(63) Continuation of application No. PCT/CN2020/093437, filed on May 29, 2020.

(30) Foreign Application Priority Data

Dec. 25, 2019 (CN) .......................... 201911359094.0

(51) Int. Cl.
*G06K 9/00* (2022.01)
*G06T 7/13* (2017.01)
(Continued)

(52) U.S. Cl.
CPC ................ *G06T 7/13* (2017.01); *G06T 7/155* (2017.01); *G06T 7/70* (2017.01); *G06V 10/44* (2022.01);
(Continued)

(58) Field of Classification Search
CPC .................................................... G06T 7/155
See application file for complete search history.

(56) References Cited

U.S. PATENT DOCUMENTS

| | | | | |
|---|---|---|---|---|
| 6,083,162 A | * | 7/2000 | Vining | G06T 19/003 600/407 |
| 6,556,196 B1 | * | 4/2003 | Blanz | G06V 40/175 345/646 |

(Continued)

FOREIGN PATENT DOCUMENTS

| | | |
|---|---|---|
| CN | 105389835 A | 3/2016 |
| CN | 107395958 B | 11/2017 |

(Continued)

OTHER PUBLICATIONS

First Office Action of the Japanese application No. 2020-573006, dated Mar. 23, 2022, 8 pgs.

(Continued)

*Primary Examiner* — Hadi Akhavannik
(74) *Attorney, Agent, or Firm* — Cooper Legal Group, LLC

(57) ABSTRACT

A morphing part to be morphed and a morphing effect are acquired. Human body contour point information is acquired by detecting a human contour point of a human sideway image. A morphing region is determined according to the human contour point information and the morphing part. The morphing region is an image region to be morphed in the human sideway image. A human orientation is determined according to the human contour point information. A morphing direction of the morphing region is determined according to the human orientation and the morphing effect. Morphing is performed along the morphing direction in the morphing region.

20 Claims, 9 Drawing Sheets

(51) Int. Cl.
*G06T 7/155* (2017.01)
*G06T 7/70* (2017.01)
*G06V 10/44* (2022.01)
*G06V 40/10* (2022.01)

(52) U.S. Cl.
CPC ............ *G06V 40/10* (2022.01); *G06V 40/103* (2022.01); *G06T 2207/30201* (2013.01)

(56) References Cited

U.S. PATENT DOCUMENTS

| | | | |
|---|---|---|---|
| 9,949,697 B2* | 4/2018 | Iscoe | G06T 7/0016 |
| 11,538,207 B2* | 12/2022 | Li | G06T 7/74 |
| 2007/0273711 A1 | 11/2007 | Maffei | |
| 2010/0191124 A1* | 7/2010 | Prokoski | A61B 5/015 600/473 |
| 2015/0154453 A1 | 6/2015 | Wilf | |
| 2016/0042251 A1* | 2/2016 | Cordova-Diba | G06T 5/00 382/199 |
| 2016/0267664 A1 | 9/2016 | Davis et al. | |
| 2018/0267507 A1* | 9/2018 | Chen | B33Y 50/02 |
| 2019/0064794 A1* | 2/2019 | Chen | G05D 1/106 |
| 2019/0103190 A1* | 4/2019 | Schmidt | A61B 34/10 |
| 2020/0202635 A1* | 6/2020 | Liang | G06T 7/0012 |

FOREIGN PATENT DOCUMENTS

| | | |
|---|---|---|
| CN | 108550384 A | 9/2018 |
| CN | 108830200 A | 11/2018 |
| CN | 108830784 A | 11/2018 |
| CN | 108986159 A | 12/2018 |
| CN | 109242789 A | 1/2019 |
| CN | 105389835 B | 7/2019 |
| CN | 110097506 A | 8/2019 |
| CN | 110136051 A | 8/2019 |
| CN | 110223220 A | 9/2019 |
| CN | 110288519 A | 9/2019 |
| CN | 110288520 A | 9/2019 |
| CN | 110288521 A | 9/2019 |
| CN | 111105348 A | 5/2020 |
| JP | H10-240908 A | 9/1998 |
| JP | H10283469 A | 10/1998 |
| JP | H11-175765 A | 7/1999 |
| JP | 2008123086 A | 5/2008 |
| JP | 2010003251 A | 1/2010 |
| JP | 6013669 B1 | 10/2016 |
| JP | 6116784 B1 | 4/2017 |
| TW | I315042 B | 9/2009 |

OTHER PUBLICATIONS

International Search Report in the international application No. PCT/CN2020/093437, dated Oct. 9, 2020, 2 pgs.
First Office Action of the Chinese application No. 201911359094.0, dated Aug. 24, 2022, 28 pages.
Notice of Allowance of the Japanese application No. 2020-573006, dated Nov. 2, 2022, 5 pages.
First Office Action of the Korean application No. 10-2020-7037114, dated Nov. 28, 2022, 18 pages.
Written Opinion cited in PCT/CN2020/093437, dated Oct. 9, 2020, 9 pages.

* cited by examiner

METHOD AND DEVICE FOR PROCESSING IMAGE, AND STORAGE MEDIUM

CROSS-REFERENCE TO RELATED APPLICATIONS

This application is a continuation of International Application No. PCT/CN2020/093437, filed on May 29, 2020, which per se is based on and claims benefit of priority to Chinese Application No. 201911359094.0, filed on Dec. 25, 2019. The disclosures of International Application No. PCT/CN2020/093437 and Chinese Application No. 201911359094.0 are is hereby incorporated by reference in their entireties.

TECHNICAL FIELD

The subject disclosure relates to the field of images, and more particularly, to a method and device for processing an image, and a storage medium.

BACKGROUND

After an image has been collected using a camera, etc., the image may have to be morphed to meet needs of different applications or to satisfy different user expectations. Take a human as an example. Most morphing operations in related art are performed on the front of the human. Art for morphing the profile of the human is immature. To morph a profile, a sideway contour point of the human dedicated to sideway morphing of the human may have to be acquired. Sideway morphing may be performed through the sideway contour point. However, since a sideway contour point of the human differs from a conventional contour point of the human, extraction of the sideway contour point of the human may require training of a dedicated neural network for extraction. On one hand, training the dedicated neural network may take a long period, leading to a large overhead of early-stage deployment of sideway morphing. On the other hand, a sideway contour point of the human may not be extracted precisely with the trained neural network, which will lead to a poor morphing effect due to the low precision in extracting the sideway contour point of the human.

SUMMARY

Embodiments herein provide a method and device for processing an image, and a storage medium.

A technical solution herein may be implemented as follows.

According to a first aspect herein, a method for processing an image includes:

acquiring a morphing part to be morphed in a human and a morphing effect;

acquiring human contour point information by detecting a human contour point of a human sideway image;

determining a morphing region according to the human contour point information and the morphing part, the morphing region being an image region to be morphed in the human sideway image; determining a human orientation according to the human contour point information;

determining a morphing direction of the morphing region according to the human orientation and the morphing effect; and performing morphing along the morphing direction in the morphing region.

In some optional embodiments herein, determining the human orientation according to the human contour point information may include: determining the human orientation according to human contour point information associated with the morphing part in the human contour point information.

In some optional embodiments herein, the morphing part may be a chest.

Determining the morphing region according to the human contour point information and the morphing part may include:

determining a first rectangular region including the chest according to chest contour point information in the human contour point information; and determining, according to the first rectangular region, the morphing region on which chest morphing is performed.

In some optional embodiments herein, determining, according to the first rectangular region, the morphing region on which chest morphing is performed may include:

determining a midpoint of a rectangle side of the first rectangular region near the human orientation, and determining a first distance between the midpoint and a center point of the first rectangular region; and determining a round region in the human sideway image as the morphing region on which chest morphing is performed, the round region being enclosed by a circle with the midpoint as a center and with a radius equaling the first distance.

In some optional embodiments herein, a morphing arc may be formed by connecting pixels in the round region that are at equal distances to the center point of the first rectangular region. The morphing arc may include a first morphing arc and a second morphing arc. An average of morphing amplitudes of pixels on the first morphing arc is greater than an average of morphing amplitudes of pixels on the second morphing arc. A distance between the first morphing arc and the center of the round region may be less than a distance between the second morphing arc and the center of the round region.

In addition/alternatively, pixels in the round region may include a first pixel and a second pixel. A morphing amplitude of the first pixel may be greater than a morphing amplitude of the second pixel. A distance between the first pixel and the center of the round region may be less than a distance between the second pixel and the center of the round region.

In some optional embodiments herein, the morphing part may be a hip. Determining the morphing region according to the human contour point information and the morphing part may include: determining a second rectangular region including the hip and an abdomen according to hip contour point information and abdomen contour point information in the human contour point information. The second rectangular region may be the morphing region.

In some optional embodiments herein, performing morphing along the morphing direction in the morphing region may include:

dividing, based on a central axis of the second rectangular region, the second rectangular region into a first sub-region including the hip and a second sub-region including the abdomen;

performing mesh morphing on the first sub-region along the morphing direction according to a first morphing amplitude; and performing mesh morphing on the second sub-region along the morphing direction according to a second morphing amplitude, the second morphing amplitude being greater than the first morphing amplitude.

In some optional embodiments herein, the method may further include: determining a morphing amplitude of the morphing region according to the morphing effect.

Performing morphing along the morphing direction in the morphing region may include: performing morphing along the morphing direction in the morphing region according to the morphing amplitude.

In some optional embodiments herein, the method may further include:

predicting a weight status factor of the human according to the human contour point information;

determining a morphing amplitude level according to the weight status factor; and determining a morphing amplitude of the morphing part based on the morphing amplitude level and a morphing amplitude input.

Performing morphing along the morphing direction in the morphing region may include:

performing morphing on the morphing region along the morphing direction according to the morphing amplitude.

In some optional embodiments herein, predicting the weight status factor of the human according to the human contour point information may include:

determining at least one first-type distance according to contour point information of at least one part in the human contour point information, the contour point information of the at least one part including at least one of shoulder contour point information, waist contour point information, crotch contour point information, and leg contour point information;

determining at least one second-type distance according to shoulder contour point location information to crotch contour point location information in the human contour point information; and determining the weight status factor according to the at least one first-type distance and the at least one second-type distance.

In some optional embodiments herein, determining the weight status factor according to the at least one first-type distance and the at least one second-type distance may include:

determining a ratio of each of the at least one first-type distance to each of the at least one second-type distance; and determining the weight status factor based on a weighted average of each of the ratio as determined.

In some optional embodiments herein, determining the at least one second-type distance according to the shoulder contour point location information to the crotch contour point location information in the human contour point information may include at least one of:

determining one second-type distance according to left shoulder contour point location information to left crotch contour point location information in the human contour point information;

determining one second-type distance according to right shoulder contour point location information to right crotch contour point location information in the human contour point information; and determining shoulder center point location information according to the left shoulder contour point location information and the right shoulder contour point location information in the human contour point information, determining crotch center point location information according to the left crotch contour point location information and the right crotch contour point location information, and determining one second-type distance according to the shoulder center point location information and the crotch center point location information.

In some optional embodiments herein, performing morphing along the morphing direction in the morphing region may include performing mesh morphing on the morphing region by:

dividing the morphing region into a third sub-region and a fourth sub-region, the third sub-region being a connected region with same morphing amplitudes, the fourth sub-region being a region in the morphing region other than the third sub-region;

performing mesh morphing of same morphing amplitudes on the third sub-region; and performing mesh morphing of different morphing amplitudes on the fourth sub-region according to a morphing curve.

In some optional embodiments herein, the third sub-region may be a region with a maximum morphing amplitude.

In some optional embodiments herein, the morphing curve may be a cosine curve or a spline curve.

According to a second aspect herein, a device for processing an image includes an acquiring module, a detecting module, a determining module, and a morphing module.

The acquiring module is configured for acquiring a morphing part to be morphed in a human and a morphing effect.

The detecting module is configured for acquiring human contour point information by detecting a human contour point of a human sideway image.

The determining module is configured for determining a morphing region according to the human contour point information and the morphing part, the morphing region being an image region to be morphed in the human sideway image; determining a human orientation according to the human contour point information; and determining a morphing direction of the morphing region according to the human orientation and the morphing effect.

The morphing module is configured for performing morphing along the morphing direction in the morphing region.

In some optional embodiments herein, the determining module may be configured for determining the human orientation according to human contour point information associated with the morphing part in the human contour point information.

In some optional embodiments herein, the morphing part may be a chest. The determining module may be configured for:

determining a first rectangular region including the chest according to chest contour point information in the human contour point information; and determining, according to the first rectangular region, the morphing region on which chest morphing is performed.

In some optional embodiments herein, the determining module may be configured for:

determining a midpoint of a rectangle side of the first rectangular region near the human orientation, and determining a first distance between the midpoint and a center point of the first rectangular region; and determining a round region in the human sideway image as the morphing region on which chest morphing is performed, the round region being enclosed by a circle with the midpoint as a center and with a radius equaling the first distance.

In some optional embodiments herein, a morphing arc may be formed by connecting pixels in the round region that are at equal distances to the center point of the first rectangular region. The morphing arc may include a first morphing arc and a second morphing arc. An average of morphing amplitudes of pixels on the first morphing arc may be greater than an average of morphing amplitudes of pixels on the second morphing arc. A distance between the first morphing arc and the center of the round region may be less than a distance between the second morphing arc and the center of the round region.

In addition/alternatively, pixels in the round region may include a first pixel and a second pixel. A morphing amplitude of the first pixel may be greater than a morphing amplitude of the second pixel. A distance between the first pixel and the center of the round region may be less than a distance between the second pixel and the center of the round region.

In some optional embodiments herein, the morphing part may be a hip.

The determining module may be configured for: determining a second rectangular region including the hip and an abdomen according to hip contour point information and abdomen contour point information in the human contour point information. The second rectangular region may be the morphing region.

In some optional embodiments herein, the morphing module may be configured for:
dividing, based on a central axis of the second rectangular region, the second rectangular region into a first sub-region including the hip and a second sub-region including the abdomen;
performing mesh morphing on the first sub-region along the morphing direction according to a first morphing amplitude; and
performing mesh morphing on the second sub-region along the morphing direction according to a second morphing amplitude.

The second morphing amplitude may be greater than the first morphing amplitude.

In some optional embodiments herein, the determining module may be further configured for determining a morphing amplitude of the morphing region according to the morphing effect.

The morphing module may be configured for performing morphing along the morphing direction in the morphing region according to the morphing amplitude.

In some optional embodiments herein, the device may further include a predicting module configured for predicting a weight status factor of the human according to the human contour point information.

The determining module may be further configured for: determining a morphing amplitude level according to the weight status factor; and determining a morphing amplitude of the morphing part based on the morphing amplitude level and a morphing amplitude input.

The morphing module may be configured for performing morphing on the morphing region along the morphing direction according to the morphing amplitude.

In some optional embodiments herein, the predicting module may be configured for:
determining at least one first-type distance according to contour point information of at least one part in the human contour point information, the contour point information of the at least one part including at least one of shoulder contour point information, waist contour point information, crotch contour point information, and leg contour point information;
determining at least one second-type distance according to shoulder contour point location information to crotch contour point location information in the human contour point information; and
determining the weight status factor according to the at least one first-type distance and the at least one second-type distance.

In some optional embodiments herein, the predicting module may be configured for:
determining a ratio of each of the at least one first-type distance to each of the at least one second-type distance; and
determining the weight status factor based on a weighted average of each of the ratio as determined.

In some optional embodiments herein, the predicting module may be configured for at least one of:
determining one second-type distance according to left shoulder contour point location information to left crotch contour point location information in the human contour point information;
determining one second-type distance according to right shoulder contour point location information to right crotch contour point location information in the human contour point information; and
determining shoulder center point location information according to the left shoulder contour point location information and the right shoulder contour point location information in the human contour point information, determining crotch center point location information according to the left crotch contour point location information and the right crotch contour point location information, and determining one second-type distance according to the shoulder center point location information and the crotch center point location information.

In some optional embodiments herein, the morphing module may be configured for performing mesh morphing on the morphing region by:
dividing the morphing region into a third sub-region and a fourth sub-region, the third sub-region being a connected region with same morphing amplitudes, the fourth sub-region being a region in the morphing region other than the third sub-region;
performing mesh morphing of same morphing amplitudes on the third sub-region; and
performing mesh morphing of different morphing amplitudes on the fourth sub-region according to a morphing curve.

In some optional embodiments herein, the third sub-region may be a region with a maximum morphing amplitude.

In some optional embodiments herein, the morphing curve may be a cosine curve or a spline curve.

According to a third aspect herein, a device for processing an image includes memory and a processor connected to the memory.

The memory is configured for storing computer-executable instructions.

The processor is configured for implementing a method for processing an image according to any technical solution of the first aspect.

According to a fourth aspect herein, a non-transitory computer storage medium has stored thereon computer-executable instructions which, when executed by a processor, implement a method for processing an image according to any technical solution of the first aspect.

With a method for processing an image herein, a human contour point used may differ from a human sideway contour point dedicated to sideway morphing of the human. Human contour point information may be extracted by directly using human contour point information extracted by a neural network for frontal human morphing. Accordingly, to morph a morphing part in a human sideway image, no human sideway contour point has to be specifically extracted, and no neural network dedicated to human sideway contour point extraction has to be trained. In view of this, an overhead of early-stage development and deployment of a processing model such as a neural network for morphing a human sideway image may be small. A pool morphing effect caused by special training of a neural network for human sideway contour point development may be reduced. Accordingly, a human sideway image may be morphed using human contour point information of human contour points, with a small overhead and a good morphing effect.

BRIEF DESCRIPTION OF THE ACCOMPANYING DRAWINGS

DETAILED DESCRIPTION

A technical solution herein will be further elaborated below in conjunction with the drawings and specific embodiments of the specification.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a term "if" as used herein may be interpreted as "when" or "while" or "in response to determining that".

Figure 1:
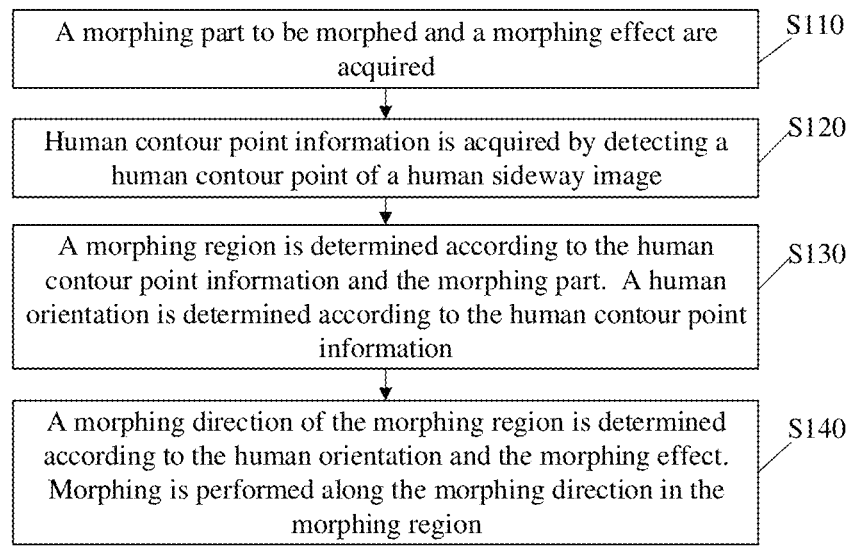
FIG. 1 is a flowchart of a method for processing an image according to an embodiment herein.

As shown in FIG. 1, embodiments herein provide a method for processing an image. The method may include steps as follows.

In S110, a morphing part to be morphed in a human and a morphing effect are acquired.

In S120, human contour point information is acquired by detecting a human contour point of a human sideway image.

In S130, a morphing region is determined according to the human contour point information and the morphing part. The morphing region is an image region to be morphed in the human sideway image. A human orientation is determined according to the human contour point information.

In S140, a morphing direction of the morphing region is determined according to the human orientation and the morphing effect. Morphing is performed along the morphing direction in the morphing region.

A method for processing an image herein may be applied to various devices for processing an image. A device for processing an image may include various terminal equipment and servers capable of information processing. Terminal equipment may include a mobile phone, a tablet computer, wearable equipment, etc., for example. A server may process an image.

Here, in S110, the morphing part to be morphed may be acquired in multiple modes. Some optional modes are provided below.

In a mode 1, the morphing part to be morphed may be determined according to a user operation received by a device for processing an image. For example, if a user operation acting on a specific morphing part to be morphed is detected on a morphing interface of a morphing application, then the part on which the user operation acts may be determined as the morphing part to be morphed.

In a mode 2, the morphing part to be morphed may be triggered according to an image morphing event built in a device for processing an image. An image morphing event may include one-click retouching or body contouring, etc., for example. Exemplarily, multiple body contouring events for various morphing parts to be morphed by one-click retouching or body contouring, such as a chest, a hip, etc., may be built in the device for processing an image. Any retouching or body contouring event for any morphing part may correspond to an operation key. If a user operates an operation key, morphing processing may be performed on a morphing part corresponding to the operation key. Understandably, a morphing part to be morphed may be triggered by a morphing event inside the device for processing an image.

A morphing part to be morphed in a human may be any of one or more parts to be morphed in a human sideway image. A possible morphing part to be morphed may include at least one of a chest, a waist, a hip, an abdomen, a leg, or a shoulder. A morphing effect corresponding respectively to each part may be chest enhancement, waist slimming, hip enhancement, abdomen reduction, leg elongation, shoulder slimming, etc.

Here, a human sideway image may be an image collected when a human faces a collection angle of vision of a collecting device sideways. Understandably, the front of the human is not presented, or not fully presented, in a human sideway image.

Figure 2:
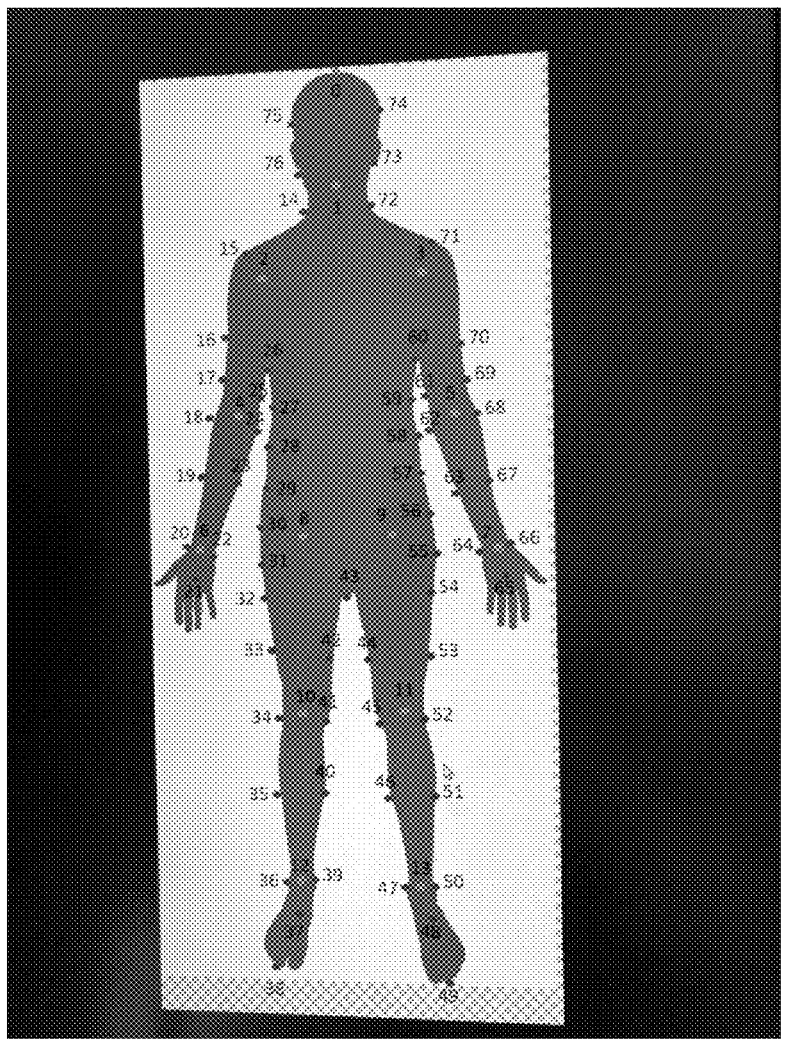
FIG. 2 is a diagram of distribution of human contour points according to an embodiment herein.

FIG. 2 is a diagram of distribution of human contour points according to an embodiment herein. In FIG. 2, a human contour point 0 and human contour points 73 to 78 may be human head contour points. A human contour point 14 and a human contour point 72 may be neck contour points. Human contour points 15 to 25 may be contour points of one upper limb of the human. Human contour points 60 to 71 may be contour points of the other upper limb of the human. Human contour points 26 to 31 may be contour points on one side of the human trunk. Human contour points 55 to 60 may be contour points on the other side of the human trunk. A contour point 43 may be a crotch contour point. Human contour points 32 to 42 may be contour points of one lower limb of the human. Human contour points 44 to 54 may be contour points of the other lower limb of the human.

Herein, human contour point detection may be performed on a human sideway image using a neural network, thereby acquiring the human contour point information in the human sideway image.

Figure 3:
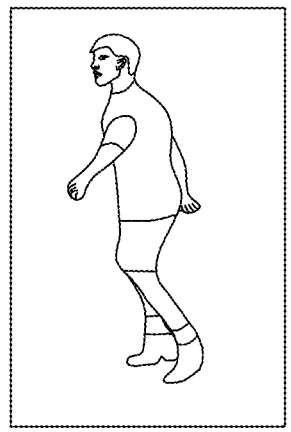
FIG. 3 is a diagram of an effect of a human sideway image according to an embodiment herein.

FIG. 3 is a diagram of an effect of a human sideway image according to an embodiment herein. Human contour point information may be acquired by processing the human sideway image through a model such as a neural network. Herein, part or all of human contour points shown in FIG. 2 may be detected.

In some embodiments, human contour point information may include information of human contour points on both sides of the human. Contour points on both sides of the human may include information of human contour points on the left side of the human and/or information of human contour points on the right side of the human.

A human contour point may differ from a human sideway contour point dedicated to sideway morphing of the human. That is, a human contour point herein may be a point other than a human sideway contour point. A human contour point here may be a contour point for frontal human morphing. Accordingly, human contour point information may be extracted by directly using human contour point information extracted by a neural network for frontal human morphing.

Accordingly, to morph a morphing part in a human sideway image, no human sideway contour point has to be specifically extracted, and no neural network dedicated to human sideway contour point extraction has to be trained. In view of this, an overhead of early-stage development and deployment of a processing model such as a neural network for morphing a human sideway image may be small. A pool morphing effect caused by special training of a neural network for human sideway contour point development may be reduced. Furthermore, a human sideway image may be morphed using human contour point information of human contour points, with a small overhead and a good morphing effect.

In some embodiments, human contour point information may include at least information on a location of a human contour point. Exemplarily, information on a location of a human contour point may include a coordinate of the human contour point in an image. In some embodiments, information on a location of a human contour point may be an image coordinate of the human contour point in a human sideway image. In actual processing, information on a location of a human contour point may not be limited to an image coordinate. Information on a location of a human contour point may also be expressed by a pixel location. For example, information on a location of a human contour point may be expressed as (x, y). The x may represent a column numbering of a column including a pixel of the image corresponding to the human contour point. The y may represent a row numbering of a row including the pixel corresponding to the human contour point.

In some other embodiments, in addition to location information, human contour point information may further include identification information of a human contour point. The identification information may show correspondence between the human contour point and the human. For example, in addition to location information of a contour point, chest human contour point information may further include identification information indicating that the contour point is a chest contour point.

Here, a human contour point may be information about a contour point on a human contour, rather than contour point information of a human skeleton. Contour points may include, in a descending order, a head contour point, a neck contour point, a shoulder contour point, a chest contour point, a waist contour point, a crotch contour point, a leg contour point, a knee contour point, a foot contour point, etc., of the human.

Herein, after human contour point information has been acquired from a human sideway image via performing human contour point detection, a morphing region may be determined according to the human contour point information and a morphing part. The morphing region may include at least an image region of the morphing part to be morphed. Location information and identification information of a human contour point in the human contour point information may indicate a location of the morphing part to be morphed in the human sideway image. Therefore, in S130 herein, the image region where the part to be morphed is located may be determined according to the morphing part to be morphed and the contour point information, thereby acquiring the morphing region.

For example, to perform chest enhancement morphing on the chest, the morphing region may include at least an image region where the chest is located in the human sideway image. As another example, to perform hip enhancement morphing on the hip, the morphing region may include at least an image region where the hip is located in the human sideway image. As another example, to perform shoulder slimming morphing on the shoulder, the morphing region may include at least an image region where the shoulder is located in the human sideway image.

After the morphing region has been determined, a morphing parameter may have to be determined. A morphing parameter may include at least a morphing direction. A morphing direction may represent a movement direction along which a pixel in the morphing region moves during morphing.

In some optional embodiments, a morphing direction may be related to a human orientation in a human sideway image. Herein, a human orientation may also be determined according to the human contour point information. After a human orientation has been determined, a morphing direction may be determined based on the human orientation, a morphing part, and a morphing effect to be achieved.

Although both chest enhancement and chest reduction are chest morphing, even with the same human orientation, due to different morphing effects, after the morphing region has been determined based on the morphing part, morphing directions determined combining the human orientation and the different morphing effects may differ. For example, the morphing part to be morphed may be the chest, and the morphing effect may be chest enhancement. Accordingly, the morphing region may be determined according to the morphing part to be morphed and human contour points. It may be found that the human faces the right side. Combining the morphing effect of chest enhancement, pixels in the morphing region corresponding to the chest may have to be dilated rightward. Thus, the morphing direction is to the right side of the image. As another example, the chest may be the morphing part to be morphed, and chest reduction may be the morphing effect to be achieved on the chest. Accordingly, when the human faces the right side, according to the morphing effect of chest reduction, pixels in the morphing region may have to be condensed leftward. Thus, the morphing direction may be to the left side of the image.

In some embodiments, S140 may include a step as follows. Size morphing may be performed along the morphing direction on the morphing part in the morphing region. Alternatively or additionally, shape morphing may be performed on the morphing part in the morphing region. Shape morphing may include contour morphing of the morphing part, such as face shape morphing, morphing a round face into an oval face.

In some optional embodiments, size morphing may be performed along the morphing direction on the morphing part in the morphing region as follows. Compression morphing may be performed along the morphing direction on the morphing part in the morphing region. Alternatively, expansion morphing may be performed along the morphing direction on the morphing part in the morphing region.

In some embodiments, S130 may include a step as follows. The human orientation may be determined according to human contour point information associated with the morphing part in the human contour point information. Exemplarily, if the morphing part is the chest, the human contour point information associated with the morphing part may include shoulder contour point information. If the morphing part is the hip, the human contour point information associated with the morphing part may include hip contour point information.

In some possible embodiments, if the morphing part is the chest, the human orientation may be determined according to the shoulder contour point information in the human contour point information.

Exemplarily, shoulder contour point information may include left shoulder contour point information and/or right shoulder contour point information. The human orientation may be determined according to shoulder contour point information as extracted, for example, in, but not limited to, any mode as follows.

If left shoulder contour point information has been extracted but no right shoulder contour point information has been extracted, it means that the shoulder faces a first direction. If a shoulder orientation is deemed as the human orientation, then the human may face the first direction.

If right shoulder contour point information has been extracted but no left shoulder contour point information has been extracted, it means that the shoulder faces a second direction. If the shoulder orientation is deemed as the human orientation, then the human may face the second direction. The second direction may be opposite to the first direction.

Both left shoulder contour point information and right shoulder contour point information may have been extracted. By comparing location information of two shoulder contour points, it may be found that the left shoulder is located on the outer side with respect to the right shoulder, while the right shoulder is located on the inner side with respect to the left shoulder, meaning that the shoulder orientation is in between the first direction and a third direction. The third direction may be perpendicular to both the first direction and the second direction. If the shoulder orientation is deemed as the human orientation, the human may face in between the first direction and the third direction.

For example, if the first direction is to the left side, then the second direction may be to the right side. Alternatively, if the second direction is to the right side, then the first direction may be to the left side. The third direction may face straight ahead. Therefore, the human may face straight ahead, which direction may be perpendicular to a plane including both the left side direction and the right side direction.

When both left shoulder contour point information and right shoulder contour point information have been extracted, by comparing location information of two shoulder contour points, it may be found that the right shoulder is located on the outer side with respect to the left shoulder, while the left shoulder is located on the inner side with respect to the right shoulder, meaning that the shoulder orientation is in between the second direction and the third direction. If the shoulder orientation is deemed as the human orientation, the human may face in between the second direction and the third direction.

Herein, specific modes for determining the human orientation have been exemplified. However, there may be many modes in practice which are not limited to any one of the above.

In some embodiments, the morphing part may be a chest. S130 may include a step as follows. A first rectangular region including the chest may be determined according to chest contour point information in the human contour point information. The morphing region on which chest morphing is performed may be determined according to the first rectangular region. The rectangular frame shown in FIG. 4 may be understood as the first rectangular region here.

Here, if a morphing part to be morphed is the chest, a first rectangular region may be determined according to chest contour point information. There may be one or more chest contour points. When there is one chest contour point, the first rectangular region may be constructed combining a size of the human and a size occupied by the chest based on the chest contour point. When there are multiple chest contour points, a circumscribing rectangular frame may be constructed combining the multiple chest contour points. The circumscribing rectangular frame may be the first rectangular region.

In some embodiments, the first rectangular region may be directly taken as the entire morphing region on which chest morphing is performed.

In some other embodiments, alternatively, a partial region in the first rectangular region may be selected, according to a reference parameter such as a shape of the chest, as the morphing region on which chest morphing is performed.

Here, if the chest in the human sideway image is to be morphed, the first rectangular region for chest morphing may be determined conveniently and precisely according to the chest contour point information of the chest contour points in the human contour points. Accordingly, the chest in the human sideway image may be morphed precisely, ensuring a morphing effect.

In some embodiments, the morphing region on which chest morphing is performed may be determined according to the first rectangular region as follows. A midpoint of a rectangle side of the first rectangular region near the human orientation may be determined. A first distance between the midpoint and a center point of the first rectangular region may be determined. A round region in the human sideway image may be determined as the morphing region on which chest morphing is performed. The round region may be enclosed by a circle with the midpoint as a center and with a radius equaling the first distance. In some embodiments, the round-shaped morphing region may be referred to in short as the round morphing region or the round region.

Herein, a round morphing region may be determined by selecting, as a center of the round morphing region, a midpoint of a rectangle side in the first rectangular region near the human orientation, and selecting a distance between the center and a center point of the first rectangular region as a radius. The round region enclosed by the circle shown in FIG. 4 may be the morphing region.

The center point (such as the point dest in FIG. 4) of the first rectangular region may be located in the first rectangular region. Accordingly, if the rectangle side of the first rectangular region near the human orientation is a long side of the first rectangular region, the radius of the round morphing region may be ½ of a short side of the first rectangular region. If the rectangle side of the first rectangular region near the human orientation is the short side of the first rectangle, the radius of the round morphing region may be ½ of the long side of the first rectangular region.

Herein, the round morphing region may be adapted to the shape of the chest. Accordingly, morphing the morphing region that is also round may ensure a morphing effect or result as close as possible to an ideal morphing effect expected by a user.

In some embodiments, the method may further include a step as follows. A morphing amplitude of the morphing region may be determined according to the morphing effect. The morphing amplitude may be understood as a morphing amount. Then, S140 may include a step as follows. Morphing may be performed along the morphing direction in the morphing region according to the morphing amplitude.

In some embodiments, a morphing arc may be formed by connecting pixels in the round region that are at equal distances to the center point of the first rectangular region. The morphing arc may include a first morphing arc and a second morphing arc. An average of morphing amplitudes of pixels on the first morphing arc may be greater than an average of morphing amplitudes of pixels on the second morphing arc. A distance between the first morphing arc and the center of the round region may be less than a distance between the second morphing arc and the center of the round region.

Figure 4:
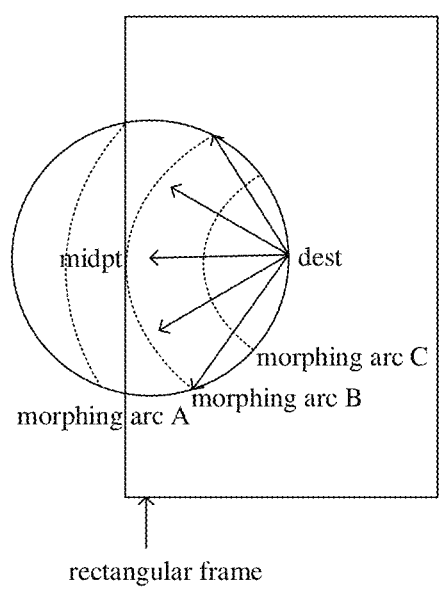
FIG. 4 is a diagram of a round morphing region and a first rectangular region for chest morphing according to an embodiment herein.

An arc formed by a dotted line in FIG. 4 may be expressed as a morphing arc. FIG. 4 shows a morphing arc A, a morphing arc B, and a morphing arc C. The morphing arc B may be a morphing arc passing through the center of the round region (i.e., a midpoint of one rectangle side of a rectangular frame corresponding to the first rectangular region). An average of morphing amplitudes of all pixels on the morphing arc B (i.e., an average morphing radian) may be greater than an average of morphing amplitudes of all pixels on the morphing arc A and an average of morphing amplitudes of all pixels on the morphing arc C, respectively. That is, an average morphing amplitude of a morphing arc decreases sequentially from the morphing arc B to the morphing arc C, and an average morphing amplitude of a morphing arc decreases sequentially from the morphing arc B to the morphing arc A. The point dest in FIG. 4 may be a point on a circumference corresponding to the round morphing region. The point dest may be the center point of the first rectangular region. An average morphing amplitude of pixels on a morphing arc may be acquired by averaging over morphing amplitudes of all the pixels on the morphing arc.

Accordingly, the average morphing amplitude may decrease gradually, from the average of morphing amplitudes of pixels on the morphing arc passing through a center point of the round region (i.e., the center, or the center point of the first rectangular region), such as the morphing arc B in FIG. 4, to the average of morphing amplitudes of pixels on a morphing arc on either side of the arc B, meaning that the average morphing radian of pixels on the morphing arc passing through the center of the round region is maximum.

In some other embodiments, pixels in the round region may include a first pixel and a second pixel. A morphing amplitude of the first pixel may be greater than a morphing amplitude of the second pixel. A distance between the first pixel and the center of the round region may be less than a distance between the second pixel and the center of the round region. In other words, within the morphing region, the morphing amplitude may decrease progressively along a radius starting from the center.

Here, progressive decrease may include linear progressive decrease. There may be multiple radii in the round region. That is, of pixels on one radius, the morphing amplitude of a pixel at the center of the round region may be maximum. Of two neighboring pixels on one radius, the morphing amplitude of the pixel farther away from the center may be smaller. That is, the pixel at the center of the round morphing region may have the maximum morphing amplitude. Herein, starting from the center, the morphing amplitude of a pixel may decrease progressively outwardly along a radius. Such progressive decrease of morphing is adapted to the shape of the chest, ensuring a morphing effect of morphing the chest.

In some other embodiments, the morphing part may be the hip. Then, a hip orientation may be determined according to hip contour point information in the human contour point information. Correspondingly, the morphing direction of the morphing region may be determined according to the hip orientation and the morphing effect.

Here, a hip orientation may be determined according to hip contour point information in an implementation mode including, but not limited to, a mode as follows.

If left hip contour point information has been extracted but no right hip contour point information has been extracted, it may mean that the hip faces a direction 1.

If right hip contour point information has been extracted but no left hip contour point information has been extracted, it may mean that the hip faces a direction 2. The direction 2 may be opposite to the direction 1.

If both left hip contour point information and right hip contour point information have been extracted, by comparing location information of two hip contour points, it may be found that the left hip is on the outer side with respect to the right hip, while the right hip is on the inner side with respect to the left hip, meaning that the hip orientation is in between the direction 1 and a direction 3. The direction 3 may be perpendicular to both the direction 1 and the direction 2.

For example, if the direction 1 is to the left side, then the direction 2 may be to the right side. Alternatively, if the direction 2 is to the right side, then the direction 1 may be to the left side. The direction 3 may face straight ahead. Therefore, the human may face straight ahead, which direction may be perpendicular to a plane including both the left side direction and the right side direction.

If both left hip contour point information and right hip contour point information have been extracted, by comparing location information of two hip contour points, it may be found that the right hip is on the outer side with respect to the left hip, while the left hip is on the inner side with respect to the right hip, meaning that the hip orientation is in between the direction 2 and the direction 3.

The hip orientation may reflect the human orientation. By default, the hip orientation may be a human back orientation, and by default may also be opposite to a human face orientation, i.e., the direction the human faces.

In some embodiments, the morphing part to be morphed may be a hip. The S130 may include a step as follows. A second rectangular region including the hip and an abdomen may be determined according to hip contour point information and abdomen contour point information in the human contour point information. The second rectangular region may be the morphing region.

Herein, when the morphing part is the hip, a second rectangular regions including the hip and the abdomen may be determined combining hip contour point information of hip contour points and abdomen contour point information of abdomen contour points.

Figure 5:
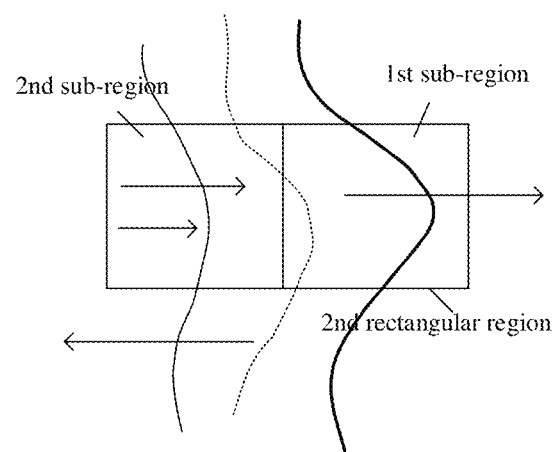
FIG. 5 is a diagram of a second rectangular region for hip morphing according to an embodiment herein.

Referring to FIG. 5, the region enclosed by the rectangular frame shown in FIG. 5 may be the second rectangular region, and may also be a second morphing region. It may be seen from FIG. 5 that the second rectangular region may include the hip and the abdomen of a human standing sideway.

Herein, to improve the hip morphing effect, the hip may be morphed by automatically extending the morphing region from an image region including only the hip to an image region including both the hip and the abdomen. Thus, while the hip is being morphed, the abdomen may be morphed synchronously, improving a hip morphing effect.

In some embodiments, S140 may include a step as follows. The second rectangular region may be divided into a first sub-region including the hip and a second sub-region including the abdomen based on a central axis of the second rectangular region. Mesh morphing may be performed on the first sub-region along the morphing direction according to a first morphing amplitude. Mesh morphing may be performed on the second sub-region along the morphing direction according to a second morphing amplitude. The second morphing amplitude may be greater than the first morphing amplitude.

Herein, the second rectangular region may be divided into a first sub-region and a second sub-region. For example, the second rectangular region may be divided evenly into the first sub-region including the hip and the second sub-region including the abdomen based on the central axis. As shown in FIG. 5, in hip enhancement morphing, morphing directions of both the hip and the abdomen may be a bulging direction of the hip.

The hip and the abdomen may be morphed in a mesh morphing mode in the second morphing region. Mesh morphing may be implemented based on a morphing mesh. The morphing mesh may include crisscross latitude and longitude lines, intersecting at mesh points. A mesh point may be used for controlling switch of the location of a pixel at the mesh point.

Herein, after separating the first sub-region from the second sub-region, mesh morphing of different morphing amplitudes may be implemented on the two sub-regions based on one morphing mesh.

Herein, the first morphing amplitude of the first sub-region including the hip may be an average morphing amplitude of mesh points in the first sub-region. The second morphing amplitude of the second sub-region including the abdomen may be an average morphing amplitude of mesh points in the second sub-region. The first morphing amplitude may be greater than the second morphing amplitude, meaning that an average morphing amount of pixels in the first sub-region is greater than an average morphing amount of pixels in the second sub-region. Here, pixel morphing may include reducing and/or increasing spacing between adjacent pixels.

In some embodiments, S140 may include a step as follows. Mesh morphing may be performed on the morphing region by: dividing the morphing region into a third sub-region and a fourth sub-region, the third sub-region being a connected region with same morphing amplitudes, the fourth sub-region being a region in the morphing region other than the third sub-region; performing mesh morphing of same morphing amplitudes on the third sub-region; and performing mesh morphing of different morphing amplitudes on the fourth sub-region according to a morphing curve.

In some embodiments, a connected region may be divided into two sub-regions according to whether morphing amplitudes of mesh points in the connected region are the same. Here, the morphing region on which mesh morphing is to be performed may be divided into the third sub-region and the fourth sub-region. Morphing amplitudes of all mesh points in the third sub-region may be the same. That is, morphing amplitudes of all pixels in the third sub-region may be the same. Morphing amplitudes of mesh points in the fourth sub-region may differ.

Figure 6:
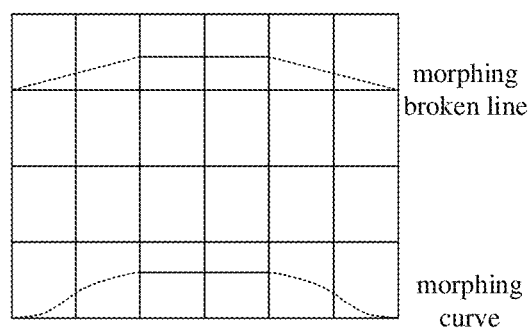
FIG. 6 is a diagram of comparing a morphing curve and a morphing broken line based on a morphing mesh according to an embodiment herein.

Mesh morphing may be performed on the fourth sub-region, with a morphing amplitude determined according to a morphing curve. Herein, a morphing curve may be a smooth morphing curve rather than a broken line. FIG. 6 shows a morphing mesh. A line connecting mesh points of the morphing mesh, that are to be displaced in order to implement morphing, may be determined to be a broken line or a curve, i.e., the morphing broken line and the morphing curve in FIG. 6. Herein, morphing may be performed using a morphing curve. Accordingly, morphing amplitudes corresponding to pixels in between two adjacent mesh points may change smoothly, unlike the morphing amplitude leap formed at a junction of two line segments as in a morphing broken line.

Figure 7:
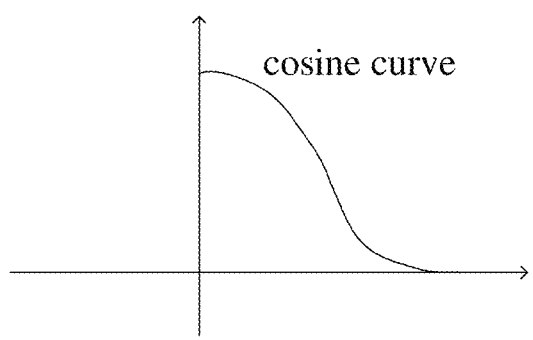
FIG. 7 is a diagram of a cosine curve according to an embodiment herein.

In some embodiments, the morphing curve may be a cosine curve or a spline curve. In this way, in mesh morphing, there may be a smooth transition among morphing amplitudes of pixels in between mesh points, unlike the case of a broken line where there is a leap change between two adjacent pixels, improving the overall morphing effect. FIG. 7 is a cosine curve. The cosine curve may serve as a morphing curve herein.

In some embodiments, the third sub-region may be a region with a maximum morphing amplitude. For example, herein, in hip morphing, the third sub-region may be a connected region with the maximum morphing amplitude in the first sub-region and/or a sub-region with the maximum morphing amplitude in the fourth sub-region.

Based on the abovementioned embodiments, in some embodiments, the method may further include a step as follows. A weight status factor of the human, indicating how thin or fat the human is, may be predicted according to the human contour point information. A morphing amplitude level may be determined according to the weight status factor. A morphing amplitude of the morphing part may be determined based on the morphing amplitude level and a morphing amplitude input.

Correspondingly, S140 may include a step as follows. Morphing may be performed on the morphing region along the morphing direction according to the morphing amplitude.

Herein, to reduce a poor morphing effect caused by uncertainty in the morphing amplitude, first, a weight status factor of the human may be predicted according to the human contour point information, which is simple to implement. Then, the weight status factor may be mapped to a morphing amplitude level. A morphing amplitude of the morphing part may be determined based on the morphing amplitude level and a morphing amplitude input.

Different morphing amplitude levels may correspond to different unit morphing amplitudes. For example, the higher the morphing amplitude level is, the greater the unit morphing amplitude. Therefore, with the same morphing amplitude input, the final morphing amplitude acquired may differ depending on the unit morphing amplitude. A morphing amplitude input may be a user input received from a human-computer interaction interface. The user input (input by a user) may be used to indicate a morphing amplitude. In some other embodiments, a device for processing an image may also receive the morphing amplitude input from other equipment.

Accordingly, the morphing amplitude may be controlled according to the weight status factor of the human in the human sideway image, to adapt the morphing effect to the weight status factor of the human, thereby reducing the phenomenon where a thin human is overly morphed while a fat human is under-morphed, rendering the morphing amplitude appropriate, achieving a morphing effect desired by the user.

In some embodiments, the weight status factor of the human may be predicted according to the human contour point information as follows. At least one first-type distance may be determined according to contour point information of at least one predetermined part in the human contour point information. The contour point information of the at least one predetermined part may include at least one of shoulder contour point information, waist contour point information, crotch contour point information, and leg contour point information. At least one second-type distance may be determined according to shoulder contour point location information to crotch contour point location information in the human contour point information. The weight status factor may be determined according to the at least one first-type distance and the at least one second-type distance.

In some embodiments, such a predetermined part may be any human part capable of reflecting the weight status factor of the human. For example, such a predetermined part may include, but is not limited to, the waist or the shoulder.

In some embodiments, contour point information of a predetermined part may be detected. A size of the predetermined part may be reflected by a first-type distance.

In some embodiments, one predetermined part may correspond to one first-type distance.

Exemplarily, a predetermined part may include at least one of the shoulder, the waist, the crotch, and the thigh. Each predetermined part may correspond to one first-type distance. Thus, a first-type distance may include at least one of a shoulder distance (i.e., a shoulder width), a waist distance (i.e., a waist width), a crotch distance (i.e., a crotch width), and a thigh distance (i.e., a thigh size). A shoulder distance may be a distance spanned by both sides of the shoulders. A waist distance may be a distance spanned by both sides of the waist. A crotch distance may be a distance spanned by both sides of the crotch section. A thigh distance may be a distance between two edges of the base of a thigh.

Here, location information of shoulder contour points to location information of crotch contour points may be detected to determine at least one second-type distance.

In this way, the weight status factor of the human may be determined with easy and convenient implementation.

Meanwhile, the weight status factor may be determined combining two types of distances. Accordingly, the degree of fatness/thinness of the human in the human sideway image may be represented at different levels, achieving a precise weight status factor of the human.

In some embodiments, the weight status factor may be determined according to the at least one first-type distance and the at least one second-type distance as follows. A ratio of each of the at least one first-type distance to each of the at least one second-type distance may be determined. The weight status factor may be determined based on a weighted average of each of the ratio as determined.

For example, if there are M first-type distances and N second-type distances, then M*N ratios may be acquired by determining the ratio of each of the M first-type distances to each of the N second-type distances respectively. Both the N and the M may be positive integers. Furthermore, the weight status factor may be computed as a weighted average of the M*N ratios.

In some other embodiments, the weight status factor may be determined according to the weighted average and a correction parameter.

A correction parameter may be related to a focal length used in collecting the human sideway image. Depending on the focal length, the same person may be imaged to have different sizes in an image. Therefore, herein, a correction parameter may be introduced based on the focal length, rendering the determined weight status factor more precise.

For example, the weight status factor may be acquired as a product of the weighted average and the correction parameter. As another example, the weight status factor may be acquired as a sum of the weighted average and the correction parameter.

In some embodiments, weights used in weighted average of the ratios may be the same or different. If the weights are the same, the weighted average may be an arithmetic mean.

In some embodiments, the at least one second-type distance may be determined according to the shoulder contour point location information to the crotch contour point location information in the human contour point information in at least one mode as follows.

One second-type distance may be determined according to left shoulder contour point location information to left crotch contour point location information in the human contour point information.

One second-type distance may be determined according to right shoulder contour point location information to right crotch contour point location information in the human contour point information.

Shoulder center point location information may be determined according to the left shoulder contour point location information and the right shoulder contour point location information in the human contour point information. Crotch center point location information may be determined according to the left crotch contour point location information and the right crotch contour point location information. One second-type distance may be determined according to the shoulder center point location information and the crotch center point location information.

In some embodiments, a first-type distance may represent a lateral distance on the human. A second-type distance may represent a longitudinal distance on the human.

Figure 8:
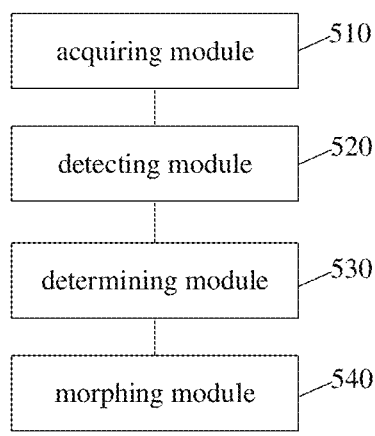
FIG. 8 is a diagram of a structure of a device for processing an image according to an embodiment herein.

As shown in FIG. 8, embodiments herein further provide a device for processing an image, which includes an acquiring module 510, a detecting module 520, a determining module 530, and a morphing module 540.

The acquiring module 510 is configured for acquiring a morphing part to be morphed in a human and a morphing effect.

The detecting module 520 is configured for acquiring human contour point information by detecting a human contour point of a human sideway image.

The determining module 530 is configured for determining a morphing region according to the human contour point information and the morphing part, the morphing region being an image region to be morphed in the human sideway image; determining a human orientation according to the human contour point information; and determining a morphing direction of the morphing region according to the human orientation and the morphing effect.

The morphing module 540 is configured for performing morphing along the morphing direction in the morphing region.

In some embodiments, the acquiring module 510, the detecting module 520, the determining module 530, and the morphing module 540 may all be program modules. Having been executed by a processor, the program modules may implement a function of any module herein.

In some other embodiments, the acquiring module 510, the detecting module 520, the determining module 530, and the morphing module 540 may all be modules combining software and hardware. The modules combining software and hardware may include various programmable arrays. A programmable array may include, but is not limited to, a complex programmable array or a field-programmable array.

In some other embodiments, the acquiring module 510, the detecting module 520, the determining module 530, and the morphing module 540 may all be pure hardware modules. A pure hardware module may include, but is not limited to, an application specific integrated circuit.

In some embodiments, the determining module 530 may be configured for determining the human orientation according to human contour point information associated with the morphing part in the human contour point information.

In some embodiments, the morphing part may be a chest. The determining module 530 may be configured for: determining a first rectangular region comprising the chest according to chest contour point information in the human contour point information; and determining, according to the first rectangular region, the morphing region on which chest morphing is performed.

In some embodiments, the determining module 530 may be configured for: determining a midpoint of a rectangle side of the first rectangular region near the human orientation, and determining a first distance between the midpoint and a center point of the first rectangular region; and determining a round region in the human sideway image as the morphing region on which chest morphing is performed, the round region being enclosed by a circle with the midpoint as a center and with a radius equaling the first distance.

In some embodiments, a morphing arc may be formed by connecting pixels in the morphing region that are at equal distances to the center point of the first rectangular region. The morphing arc may include a first morphing arc and a second morphing arc. An average of morphing amplitudes of pixels on the first morphing arc may be greater than an average of morphing amplitudes of pixels on the second morphing arc. A distance between the first morphing arc and the center of the round region may be less than a distance between the second morphing arc and the center of the round region. Additionally or alternatively, pixels in the round region may include a first pixel and a second pixel. A morphing amplitude of the first pixel may be greater than a morphing amplitude of the second pixel. A distance between the first pixel and the center of the round region may be less than a distance between the second pixel and the center of the round region.

In some embodiments, the morphing part may be a hip. The determining module 530 may be configured for: determining a second rectangular region including the hip and an abdomen according to hip contour point information and abdomen contour point information in the human contour point information. The second rectangular region may be the morphing region.

In some embodiments, the morphing module 540 may be configured for: dividing, based on a central axis of the second rectangular region, the second rectangular region into a first sub-region including the hip and a second sub-region including the abdomen; performing mesh morphing on the first sub-region along the morphing direction according to a first morphing amplitude; and performing mesh morphing on the second sub-region along the morphing direction according to a second morphing amplitude. The second morphing amplitude may be greater than the first morphing amplitude.

In some embodiments, the determining module 530 may be further configured for determining a morphing amplitude of the morphing region according to the morphing effect.

The morphing module 540 may be configured for performing morphing along the morphing direction in the morphing region according to the morphing amplitude.

In some embodiments, the device may further include a predicting module configured for predicting a weight status factor of the human according to the human contour point information.

The determining module 530 may be further configured for: determining a morphing amplitude level according to the weight status factor; and determining a morphing amplitude of the morphing part based on the morphing amplitude level and a morphing amplitude input.

The morphing module 540 may be configured for performing morphing on the morphing region along the morphing direction according to the morphing amplitude.

In some embodiments, the predicting module may be configured for: determining at least one first-type distance according to contour point information of at least one predetermined part in the human contour point information, the contour point information of the at least one predetermined part including at least one of shoulder contour point information, waist contour point information, crotch contour point information, and leg contour point information; determining at least one second-type distance according to shoulder contour point location information to crotch contour point location information in the human contour point information; and determining the weight status factor according to the at least one first-type distance and the at least one second-type distance.

In some embodiments, the predicting module may be configured for: determining a ratio of each of the at least one first-type distance to each of the at least one second-type distance; and determining the weight status factor based on a weighted average of each of the ratio as determined.

In some embodiments, the predicting module may be configured for at least one of:

determining one second-type distance according to left shoulder contour point location information to left crotch contour point location information in the human contour point information;

determining one second-type distance according to right shoulder contour point location information to right crotch contour point location information in the human contour point information; and determining shoulder center point location information according to the left shoulder contour point location information and the right shoulder contour point location information in the human contour point information, determining crotch center point location information according to the left crotch contour point location information and the right crotch contour point location information, and determining one second-type distance according to the shoulder center point location information and the crotch center point location information.

In some embodiments, the morphing module 540 may be configured for performing mesh morphing on the morphing region by: dividing the morphing region into a third sub-region and a fourth sub-region, the third sub-region being a connected region with same morphing amplitudes, the fourth sub-region being a region in the morphing region other than the third sub-region; performing mesh morphing of same morphing amplitudes on the third sub-region; and performing mesh morphing of different morphing amplitudes on the fourth sub-region according to a morphing curve.

In some embodiments, the third sub-region may be a region with a maximum morphing amplitude.

In some embodiments, the morphing curve may be a cosine curve or a spline curve.

Some specific examples are provided below combining any aforementioned embodiment.

Example 1

In related art, to perform chest enhancement processing on the chest in an image, the chest must be labeled with some contour points in order to achieve an effect of outward dilation. Now, only 77 contour points of the human contour may be required, while the chest does not have to be marked with any contour point.

In the example, when there is no profile chest contour point, contour points on both sides of the human may be extracted to estimate an approximate range of the chest, thereby determining a morphing region where the chest is located. For example, a rectangular frame where the chest is located may be estimated according to the contour points on both sides of the human. Chest enhancement processing may be performed in a partial region in the estimated rectangular frame where the chest is located. Exemplarily, chest enhancement processing may be performed combining a human orientation. If the human orientation indicates that the chest faces the right, chest enhancement processing may be performed in a region on the right of the rectangular frame where the chest is located. If the human orientation indicates that the chest faces the left, chest enhancement processing may be performed in a region on the left of the rectangular frame where the chest is located.

Example 2

In hip enhancement processing based on a human sideway image, abdomen reduction may be performed at the same time. Exemplarily, after hip enhancement processing, such as when hip enhancement processing is expanding the hip rightward, in specific implementation, a rectangular frame including both a hip region and a waist region may be divided into two sub-regions, i.e., a left sub-region on the left of the image and a right sub-region on the right of the image, respectively. Combining the hip orientation, pixels in the right sub-region may be morphed rightward, and the left sub-region may also be morphed rightward. To perform mesh morphing on the hip, by pushing a mesh point in a morphing mesh, a pixel corresponding to the mesh point may be driven to move, thereby implementing morphing by changing a distance between adjacent pixels. The right sub-region here may be the abovementioned first sub-region. The left sub-region here may be the abovementioned second sub-region.

Example 3

During mesh morphing, there may be a buffer zone correspondingly. A morphing line in the buffer zone may originally be a morphing straight line. The morphing effect achieved by morphing according to a morphing straight line may not be so desirable. In the example, a cosine (cos) curve, instead of a straight line, may be used as the morphine line in the buffer zone. Such a curve is selected to achieve a better morphing effect in morphing such as hip enhancement. A buffer zone here may be a region including multiple mesh points of different morphing amplitudes.

Example 4

The example provides a method for determining a weight status factor in body contouring. The method may be applied to an application scene of smart body contouring.

A device for processing an image may estimate a weight status factor of a portrait of a person automatically to indicate fatness/thinness of the person. For a portrait with a large weight status factor, a slimming amplitude may be large. For a portrait with a small weight status factor, a slimming amplitude may be small. A slimming amplitude may be one of the abovementioned morphing amplitude. A slimming amplitude here may be a morphing amplitude of slimming the human to achieve a morphing effect of slimming.

A weight status factor may be determined as follows.

A shoulder width, a crotch width, a distance from the neck to the crotch, and a minimum distance from the shoulder to the hip may be estimated based on location information of a predetermined number of human contour points. Here, the shoulder width and the crotch width may be the abovementioned first-type distances. The distance from the neck to the crotch and the minimum distance from the shoulder to the hip may be the abovementioned second-type distances.

A first-type distance corresponding to the shoulder width, a first-type distance corresponding to the crotch width, a first-type distance corresponding to a waist width, a first-type distance corresponding to a leg width, etc., may be formed according to lateral lines connecting the corresponding contour points. A longitudinal line segment may be formed by connecting a left shoulder contour point to a left crotch contour point. Another longitudinal line segment may be formed by connecting a right shoulder contour point to a right crotch contour point. Yet another longitudinal line segment may be formed by connecting a center point of the right shoulder and the left shoulder to a center point of the right crotch and the left crotch. Lengths of the three line segments may correspond to the abovementioned second-type distances.

A weighted average of all ratios may be computed as a weight status factor of the human to be acquired according to the ratio of each first-type distance to each second-type distance.

Figure 9:
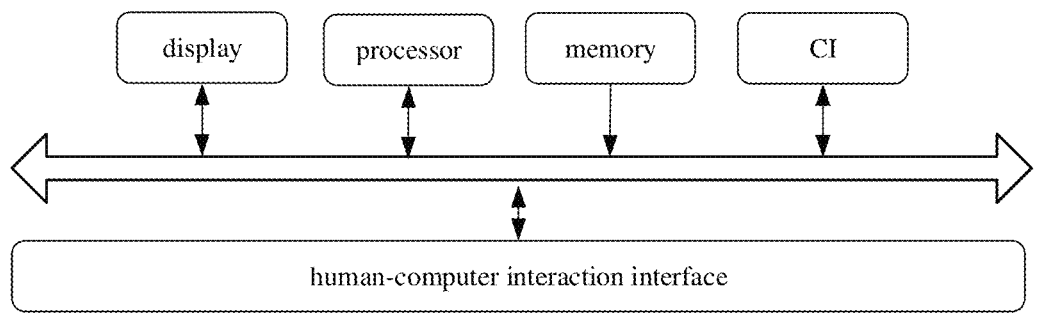
FIG. 9 is a diagram of a structure of a device for processing an image according to an embodiment herein.

As shown in FIG. 9, embodiments herein further provide a device for processing an image, which includes memory and a processor.

The memory is configured for store information.

The processor is connected to a display and the memory respectively. The processor is configured for implementing, by executing computer-executable instructions stored in the memory, a method for processing an image provided in one or more abovementioned technical solutions, such as the method for processing an image as shown in FIG. 1.

The memory may be various types of memory, such as Random Access Memory (RAM), Read-Only Memory (ROM), flash memory, etc. The memory may be used for storing information, such as computer-executable instructions. The computer-executable instructions may be various program instructions, such as target program instructions and/or source program instructions.

The processor may be various types of processors, such as a central processing unit, a microprocessor, a digital signal processor, a programmable array, a digital signal processor, an application specific integrated circuit, an image processor, etc.

The processor may be connected to the memory through a bus. The bus may be an integrated circuit bus, etc.

In some embodiments, the terminal equipment may further include a communication interface (CI). The communication interface may include a network interface, such as a local area network interface, a transceiver antenna, etc. The communication interface may also be connected to the processor and may be configured for transmitting and receiving information.

In some embodiments, the terminal equipment may further include a human-computer interaction interface. For example, the human-computer interaction interface may include various input/output equipment such as a keyboard, a touch screen, etc.

In some embodiments, the device for processing an image may further include a display. The display may display various prompts, collected face images and/or various interfaces.

Embodiments herein provide a computer storage medium having stored thereon a computer executable code which, when executed, may implement a method for processing an image provided in one or more abovementioned technical solutions, such as the method for processing an image as shown in FIG. 1.

Note that in embodiments herein, the disclosed equipment and method may be implemented in other ways. The described equipment embodiments are merely exemplary. For example, the unit division is merely logical function division and may be other division in actual implementation. For example, multiple units or components may be combined, or integrated into another system, or some features/characteristics may be omitted or skipped. Furthermore, the coupling, or direct coupling or communicational connection among the components illustrated or discussed herein may be implemented through indirect coupling or communicational connection among some interfaces, equipment, or units, and may be electrical, mechanical, or in other forms.

The units described as separate components may or may not be physically separated. Components shown as units may be or may not be physical units; they may be located in one place, or distributed on multiple network units. Some or all of the units may be selected to achieve the purpose of a solution of the embodiments as needed.

In addition, various functional units in each embodiment of the subject disclosure may be integrated in one processing module, or exist as separate units respectively; or two or more such units may be integrated in one unit. The integrated unit may be implemented in form of hardware, or hardware plus software functional unit(s).

Technical features disclosed in any embodiment herein may be combined arbitrarily to form a new method embodiment or a new device embodiment as long as no conflict results from the combination.

Method embodiments disclosed in any embodiment herein may be combined arbitrarily to form a new method embodiment as long as no conflict results from the combination.

Device embodiments disclosed in any embodiment herein may be combined arbitrarily to form a new device embodiment as long as no conflict results from the combination.

A skilled person in the art may understand that all or part of the steps of the embodiments may be implemented by instructing a related hardware through a program, which program may be stored in a computer-readable storage medium and when executed, execute steps including those of the embodiments. The computer-readable storage medium may be various media that can store program codes, such as mobile storage equipment, Read-Only Memory (ROM), a magnetic disk, a CD, etc.

What described are but embodiments herein and are not intended to limit the scope of the subject disclosure. Any modification, equivalent replacement, and/or the like made within the technical scope of the subject disclosure, as may occur to a person having ordinary skill in the art, shall be included in the scope of the subject disclosure. The scope of the subject disclosure thus should be determined by the claims.

What is claimed is:

1. A method for processing an image, comprising:
acquiring a morphing part to be morphed in a human and a morphing effect;
acquiring human contour point information by detecting a human contour point of a human sideway image;
determining a morphing region according to the human contour point information and the morphing part, the morphing region being an image region to be morphed in the human sideway image; determining a human orientation according to the human contour point information;
determining a morphing direction of the morphing region according to the human orientation and the morphing effect; and performing morphing along the morphing direction in the morphing region.

2. The method of claim 1, wherein determining the human orientation according to the human contour point information comprises: determining the human orientation according to human contour point information associated with the morphing part in the human contour point information.

3. The method of claim 1, wherein the morphing part is a chest,
wherein determining the morphing region according to the human contour point information and the morphing part comprises:
determining a first rectangular region comprising the chest according to chest contour point information in the human contour point information; and
determining, according to the first rectangular region, the morphing region on which chest morphing is performed.

4. The method of claim 3, wherein determining, according to the first rectangular region, the morphing region on which chest morphing is performed comprises:

determining a midpoint of a rectangle side of the first rectangular region near the human orientation, and determining a first distance between the midpoint and a center point of the first rectangular region; and determining a round region in the human sideway image as the morphing region on which chest morphing is performed, the round region being enclosed by a circle with the midpoint as a center and with a radius equaling the first distance.

5. The method of claim 4, wherein a morphing arc is formed by connecting pixels in the round region that are at equal distances to the center point of the first rectangular region, wherein the morphing arc comprises a first morphing arc and a second morphing arc, wherein an average of morphing amplitudes of pixels on the first morphing arc is greater than an average of morphing amplitudes of pixels on the second morphing arc, wherein a distance between the first morphing arc and the center of the round region is less than a distance between the second morphing arc and the center of the round region, and/or wherein pixels in the round region comprise a first pixel and a second pixel, wherein a morphing amplitude of the first pixel is greater than a morphing amplitude of the second pixel, wherein a distance between the first pixel and the center of the round region is less than a distance between the second pixel and the center of the round region.

6. The method of claim 1, wherein the morphing part is a hip, wherein determining the morphing region according to the human contour point information and the morphing part comprises:

determining a second rectangular region comprising the hip and an abdomen according to hip contour point information and abdomen contour point information in the human contour point information, the second rectangular region being the morphing region.

7. The method of claim 6, wherein performing morphing along the morphing direction in the morphing region comprises:

dividing, based on a central axis of the second rectangular region, the second rectangular region into a first sub-region comprising the hip and a second sub-region comprising the abdomen;

performing mesh morphing on the first sub-region along the morphing direction according to a first morphing amplitude; and performing mesh morphing on the second sub-region along the morphing direction according to a second morphing amplitude, the second morphing amplitude being greater than the first morphing amplitude.

8. The method of claim 1, further comprising:

determining a morphing amplitude of the morphing region according to the morphing effect, wherein performing morphing along the morphing direction in the morphing region comprises:

performing morphing along the morphing direction in the morphing region according to the morphing amplitude.

9. The method of claim 1, further comprising:

predicting a weight status factor of the human according to the human contour point information;

determining a morphing amplitude level according to the weight status factor; and determining a morphing amplitude of the morphing part based on the morphing amplitude level and a morphing amplitude input, wherein performing morphing along the morphing direction in the morphing region comprises:

performing morphing on the morphing region along the morphing direction according to the morphing amplitude.

10. The method of claim 9, wherein predicting the weight status factor of the human according to the human contour point information comprises:

determining at least one first-type distance according to contour point information of at least one part in the human contour point information, the contour point information of the at least one part comprising at least one of shoulder contour point information, waist contour point information, crotch contour point information, and leg contour point information;

determining at least one second-type distance according to shoulder contour point location information to crotch contour point location information in the human contour point information; and determining the weight status factor according to the at least one first-type distance and the at least one second-type distance.

11. The method of claim 10, wherein determining the weight status factor according to the at least one first-type distance and the at least one second-type distance comprises:

determining a ratio of each of the at least one first-type distance to each of the at least one second-type distance; and determining the weight status factor based on a weighted average of each of the ratio as determined.

12. The method of claim 10, wherein determining the at least one second-type distance according to the shoulder contour point location information to the crotch contour point location information in the human contour point information comprises at least one of:

determining one second-type distance according to left shoulder contour point location information to left crotch contour point location information in the human contour point information;

determining one second-type distance according to right shoulder contour point location information to right crotch contour point location information in the human contour point information; and determining shoulder center point location information according to the left shoulder contour point location information and the right shoulder contour point location information in the human contour point information, determining crotch center point location information according to the left crotch contour point location information and the right crotch contour point location information, and determining one second-type distance according to the shoulder center point location information and the crotch center point location information.

13. The method of claim 1, wherein performing morphing along the morphing direction in the morphing region comprises performing mesh morphing on the morphing region by:

dividing the morphing region into a third sub-region and a fourth sub-region, the third sub-region being a connected region with same morphing amplitudes, the fourth sub-region being a region in the morphing region other than the third sub-region;

performing mesh morphing of same morphing amplitudes on the third sub-region; and performing mesh morphing of different morphing amplitudes on the fourth sub-region according to a morphing curve.

14. The method of claim 13, wherein the third sub-region is a region with a maximum morphing amplitude.

15. The method of claim 13, wherein the morphing curve is a cosine curve or a spline curve.

16. A device for processing an image, comprising memory and a processor connected to the memory,
wherein the memory is configured for storing computer-executable instructions,
wherein the processor is configured for:
acquiring a morphing part to be morphed in a human and a morphing effect;
acquiring human contour point information by detecting a human contour point of a human sideway image;
determining a morphing region according to the human contour point information and the morphing part, the morphing region being an image region to be morphed in the human sideway image; determining a human orientation according to the human contour point information;
determining a morphing direction of the morphing region according to the human orientation and the morphing effect; and performing morphing along the morphing direction in the morphing region.

17. The device of claim 16, wherein the processor is configured for determining the human orientation according to the human contour point information by: determining the human orientation according to human contour point information associated with the morphing part in the human contour point information.

18. The device of claim 16, wherein the morphing part is a chest,
wherein the processor is configured for determining the morphing region according to the human contour point information and the morphing part by:
determining a first rectangular region comprising the chest according to chest contour point information in the human contour point information; and
determining, according to the first rectangular region, the morphing region on which chest morphing is performed.

19. The device of claim 16, wherein the morphing part is a hip, wherein the processor is configured for determining the morphing region according to the human contour point information and the morphing part by:
determining a second rectangular region comprising the hip and an abdomen according to hip contour point information and abdomen contour point information in the human contour point information, the second rectangular region being the morphing region.

20. A non-transitory computer storage medium, having stored thereon computer-executable instructions which, when executed by a processor, implement:
acquiring a morphing part to be morphed in a human and a morphing effect;
acquiring human contour point information by detecting a human contour point of a human sideway image;
determining a morphing region according to the human contour point information and the morphing part, the morphing region being an image region to be morphed in the human sideway image; determining a human orientation according to the human contour point information;
determining a morphing direction of the morphing region according to the human orientation and the morphing effect; and performing morphing along the morphing direction in the morphing region.

* * * * *